H. J. DEW.
LAMP FOR MOTOR VEHICLES AND LIKE SERVICES.
APPLICATION FILED MAR. 15, 1916.

1,221,037.

Patented Apr. 3, 1917.

Inventor:

Henry J. Dew,
by Spear Middleton Donaldson &c.
Atty

UNITED STATES PATENT OFFICE.

HENRY JOSEPH DEW, OF CHORLTON-CUM-HARDY, MANCHESTER, ENGLAND.

LAMP FOR MOTOR-VEHICLES AND LIKE SERVICES.

1,221,037.  Specification of Letters Patent.  Patented Apr. 3, 1917.

Application filed March 15, 1916. Serial No. 84,381.

*To all whom it may concern:*

Be it known that I, HENRY JOSEPH DEW, a subject of the King of Great Britain and Ireland, and resident of 51 High Lane, Chorlton-cum-Hardy, Manchester, in the county of Lancaster, England, have invented certain new and useful Improvements in Lamps for Motor-Vehicles and like Services, of which the following is a specification.

This invention relates to lamps and more particularly to the lamps of motor car and like vehicles, and has for its object to provide simple and efficient means for securing the lamp glass in place, such means permitting of the ready insertion of the glass into position while effectually preventing displacement due to vibration or other cause.

My invention comprises the formation in the glass holder or ring, of a tapered or undercut annular recess to receive the peripheral edge of the glass, and the provision around the edge of the glass, of a resilient material which permits of the glass being sprung into the aforesaid recess.

Referring to the accompanying sheet of explanatory drawings:—

Figure 1:
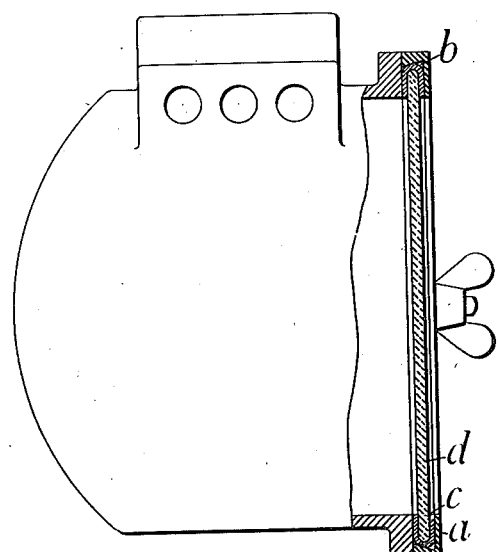
Figure 2:
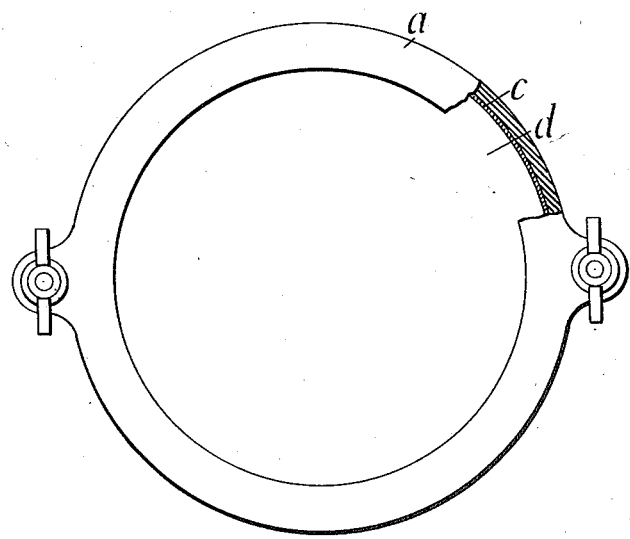

Figure 1 is a side elevation and Fig. 2 a front elevation both partly in section, of a lamp having the glass holding means constructed and arranged in accordance with my invention.

In the illustrated application of my invention, the glass holder which forms the lamp door *a* has a tapered recess *b* around the glass aperture, the narrowest portion of the recess being at the rear side or side from which the glass is inserted into the holder. An india rubber or other continuous or discontinuous ring or strip *c* is placed around the edge of the glass *d* and the latter is then sprung into the tapered recess when it is effectually held against displacement. The recess in the holder may not be of tapered form, but may be undercut without tapering, the essential being that the inlet edge of the recess is of such a restricted diameter as to necessitate the springing of the glass into place. The resilient material may not extend continuously around the edge of the glass if desired.

With my improved arrangement, I am enabled to place ordinary unmounted glasses in their holders and secure them firmly against displacement without the use of any tools or of mechanical securing devices such as at present employed. Further, the resilient material protects the edge of the glass against chipping and breakage due to the heavy vibration to which the lamp is subjected.

Having now described my invention, what I claim as new and desire to secure by Letters Patent is:—

1. Glass holding means for the lamps of motor vehicles and for like services, comprising, in combination, a ring having an undercut annular recess, a glass, and a resilient material at the edge of the glass making the latter of larger diametral dimension than the inlet edge of said undercut recess, so that the glass with the resilient material therearound is sprung into position in the recess under pressure, as set forth.

2. Glass holding means for the lamps of motor vehicles and for like services, comprising in combination, a ring having an undercut annular recess at its rear side, means for securing said ring upon the lamp, a glass for insertion in said ring, and a strip of resilient material embracing the edge of said glass and making the diameter of the latter greater than that of the inlet edge of the said undercut recess, so that the glass with the resilient material therearound is sprung into position in the recess under pressure, as set forth.

3. Glass holding means for the lamps of motor vehicles and for like services, comprising in combination, a ring having a tapered annular recess decreasing in diameter toward the rear side of the ring, a glass for insertion in said ring, and a strip of resilient material embracing the edge of said glass and making the diameter of the latter greater than that of the inlet edge of the said tapered recess, so that the glass with the resilient material therearound is sprung into position in the recess under pressure, as set forth.

In testimony whereof I have signed my name to this specification in the presence of two subscribing witnesses.

HENRY JOSEPH DEW.

Witnesses:
ARTHUR HUGHES,
HILDA HUGHES.